United States Patent
Xiao et al.

(10) Patent No.: US 11,233,729 B2
(45) Date of Patent: Jan. 25, 2022

(54) SYSTEMS AND METHODS FOR CONFIGURING SERVING CELLS FOR USER EQUIPMENT

(71) Applicants: SHARP KABUSHIKI KAISHA, Sakai (JP); FG Innovation Company Limited, Tuen Mun (HK)

(72) Inventors: Fangying Xiao, Shanghai (CN); Renmao Liu, Shanghai (CN)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 34 days.

(21) Appl. No.: 16/619,860

(22) PCT Filed: Jun. 8, 2018

(86) PCT No.: PCT/CN2018/090394
§ 371 (c)(1),
(2) Date: Dec. 5, 2019

(87) PCT Pub. No.: WO2018/224030
PCT Pub. Date: Dec. 13, 2018

(65) Prior Publication Data
US 2020/0177497 A1    Jun. 4, 2020

(30) Foreign Application Priority Data
Jun. 9, 2017   (CN) .......................... 201710436318.8

(51) Int. Cl.
*H04L 12/709*   (2013.01)
*H04W 76/15*    (2018.01)

(52) U.S. Cl.
CPC .......... *H04L 45/245* (2013.01); *H04W 76/15* (2018.02)

(58) Field of Classification Search
CPC ..... H04L 45/245; H04L 5/0091; H04L 5/001; H04L 1/08; H04W 76/15; H04W 16/10
See application file for complete search history.

(56) References Cited

U.S. PATENT DOCUMENTS

| | | | |
|---|---|---|---|
| 2014/0192775 A1* | 7/2014 | Li | H04W 76/15 370/331 |
| 2016/0234714 A1* | 8/2016 | Basu Mallick | H04W 28/0278 |
| 2016/0286412 A1* | 9/2016 | Kim | H04W 72/0406 |
| 2016/0338039 A1* | 11/2016 | Van Der Velde | H04W 74/0833 |
| 2017/0118766 A1* | 4/2017 | Baek | H04W 72/1268 |
| 2018/0309660 A1* | 10/2018 | Loehr | H04W 76/15 |
| 2018/0310202 A1* | 10/2018 | Lohr | H04W 76/19 |

(Continued)

OTHER PUBLICATIONS

NTT Docomo, "New SID Proposal: Study on New Radio Access Technology", RP-160671, 3GPP TSG RAN Meeting #71, Göteborg, Sweden, Mar. 7-10, 2016.

(Continued)

*Primary Examiner* — Hoang-Chuong Q Vu
(74) *Attorney, Agent, or Firm* — Polsinelli

(57) ABSTRACT

The present disclosure provides a method used in a base station. The method comprises: for logical channels or Radio Link Control (RLC) entities associated with packet duplication bearers, providing cell or cell group configurations to User Equipment (UE), where each cell or cell group configuration comprises two or more cells or cell groups.

4 Claims, 11 Drawing Sheets

(56) References Cited

U.S. PATENT DOCUMENTS

2018/0324642 A1* 11/2018 Yu .......................... H04L 1/22
2019/0132790 A1*  5/2019 Lee ...................... H04W 76/30
2020/0382431 A1* 12/2020 Decarreau ............... H04L 1/187

OTHER PUBLICATIONS

Nokia, Alcatel-Lucent Shanghai Bell, "Overview of Duplication Operation", R2-1702632, 3GPP TSG-RAN WG2 Meeting #97bis, Spokane, USA, Apr. 3-7, 2017.

* cited by examiner

SYSTEMS AND METHODS FOR CONFIGURING SERVING CELLS FOR USER EQUIPMENT

TECHNICAL FIELD

The present disclosure relates to wireless communication technologies field, and more particularly, to a base station, user equipment, and a related cell/cell group configuration method for a packet duplication bearer.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN#71 plenary meeting held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communications (eMBB), massive Machine Type Communications (mMTC), and Ultra Reliable and Low Latency Communications (URLLC).

In the 3GPP RAN2 #96 meeting held in October 2016, it was agreed that research will be performed on multi-connection (including dual-connection) so as to meet the reliability requirement of the URLLC. The multi-connection may adopt mechanisms such as packet duplication or link selection. In the 3GPP NR AdHoc meeting held in January 2017, it was agreed that an NR-PDCP entity supports a packet duplication function of a user plane and a control plane, where the function of a transmitting PDCP entity is to support packet duplication, while the function of a receiving PDCP entity is to support deletion of duplicate packets. In the 3GPP RAN2#97 meeting held in February 2017, it was agreed that both uplink and downlink support that in carrier aggregation, packet duplication uses a Packet Data Convergence Protocol (PDCP) packet data unit (PDU) and/or service data unit (SDU) for transmission on two or more logical channels and causes duplicate PDCP PDUs to be transmitted through different carriers. In the 3GPP RAN2#98 meeting held in April 2017, it was agreed that in radio resource control (RRC) configuration, two duplicate logical channels are mapped to different carriers, that is, duplicate logical channels cannot be mapped to the same carrier.

It is hoped that problems related to configuring a cell or a cell group for a packet duplication bearer in carrier aggregation or multi-connection scenarios will be solved.

SUMMARY

According to a first aspect of the present disclosure, a method used in a base station is provided, comprising: for logical channels or Radio Link Control (RLC) entities associated with packet duplication bearers, providing cell or cell group configurations to User Equipment (UE), where each cell or cell group configuration comprises two or more cells or cell groups.

In an embodiment, logical channels or RLC entities associated with two or more packet duplication bearers have the same cell or cell group configuration. Alternatively, the packet duplication bearers comprise a packet duplication data bearer and a packet duplication signaling bearer, and the packet duplication data bearer and the packet duplication signaling bearer have different cell or cell group configurations. Alternatively, a cell or cell group configuration of logical channels or RLC entities associated with each packet duplication bearer is separately provided.

In an embodiment, for each packet duplication bearer, each cell in a cell set pre-configured for the UE is associated with one of logical channels associated with the packet duplication bearer, where the providing cell group configurations to UE comprises: for one logical channel associated with the packet duplication bearer, explicitly configuring a first cell group for the UE so that a cell in the set and not contained in the first cell group is contained by default in a second cell group configured for another logical channel associated with the packet duplication bearer. Alternatively, for each packet duplication bearer, each cell in a subset of a cell set pre-configured for the UE is associated with one of logical channels associated with the packet duplication bearer, where the providing cell group configurations to UE comprises: for the logical channels associated with the packet duplication bearer, explicitly configuring a first cell group and a second cell group for the UE respectively.

In an embodiment, the explicitly configuring a first cell group or a second cell group comprises: for each cell, using an identity to indicate a cell group to which the cell belongs or a logical channel with which the cell is associated; or, for each cell, using a bitmap or a logical channel list to indicate a cell group to which the cell belongs or a logical channel with which the cell is associated; or, for each logical channel associated with each packet duplication bearer, using a bitmap to indicate a cell with which the logical channel is associated.

According to a second aspect of the present disclosure, a base station is provided, comprising a transceiver, a processor, and a memory, the processor storing instructions executable by the processor so that the base station executes the method according to the first aspect.

According to a third aspect of the present disclosure, a method used in User Equipment (UE) is provided, comprising: receiving, from a base station, cell or cell group configurations for logical channels or Radio Link Control (RLC) entities associated with packet duplication bearers, where each cell or cell group configuration comprises two or more cells or cell groups.

In an embodiment, logical channels or RLC entities associated with two or more packet duplication bearers have the same cell or cell group configuration. Alternatively, the packet duplication bearers comprise a packet duplication data bearer and a packet duplication signaling bearer, and the packet duplication data bearer and the packet duplication signaling bearer have different cell or cell group configurations. Alternatively, a cell or cell group configuration for logical channels or RLC entities associated with each packet duplication bearer is separately configured.

In an embodiment, for each packet duplication bearer, each cell in a cell set pre-configured for the UE is associated with one of logical channels associated with the packet duplication bearer, where the receiving cell group configurations comprise: for one logical channel associated with the packet duplication bearer, receiving an explicit configuration of a first cell group so that a cell in the set and not contained in the first cell group is contained by default in a second cell group configured for another logical channel associated with the packet duplication bearer. Alternatively, for each packet duplication bearer, each cell in a subset of a cell set pre-configured for the UE is associated with one of logical channels associated with the packet duplication bearer, where the receiving cell group configurations comprise: for the logical channels associated with the packet duplication bearer, receiving explicit configurations of a first cell group and a second cell group respectively.

In an embodiment, the explicit configuration of the first cell group or the second cell group comprises: for each cell, using an identity to indicate a cell group to which the cell belongs or a logical channel with which the cell is associated; or, for each cell, using a bitmap or a logical channel list to indicate a cell group to which the cell belongs or a logical channel with which the cell is associated; or, for each logical channel associated with each packet duplication bearer, using a bitmap to indicate a cell with which the logical channel is associated.

According to a fourth aspect of the present disclosure, User Equipment (UE) is provided, comprising a transceiver, a processor, and a memory, the processor storing instructions executable by the processor so that the UE executes the method according to the third aspect.

DESCRIPTION OF THE DRAWINGS

The above and other features of the present disclosure will become more apparent with the following detailed description in conjunction with the accompanying drawings.

DETAILED DESCRIPTION

Figure 1:
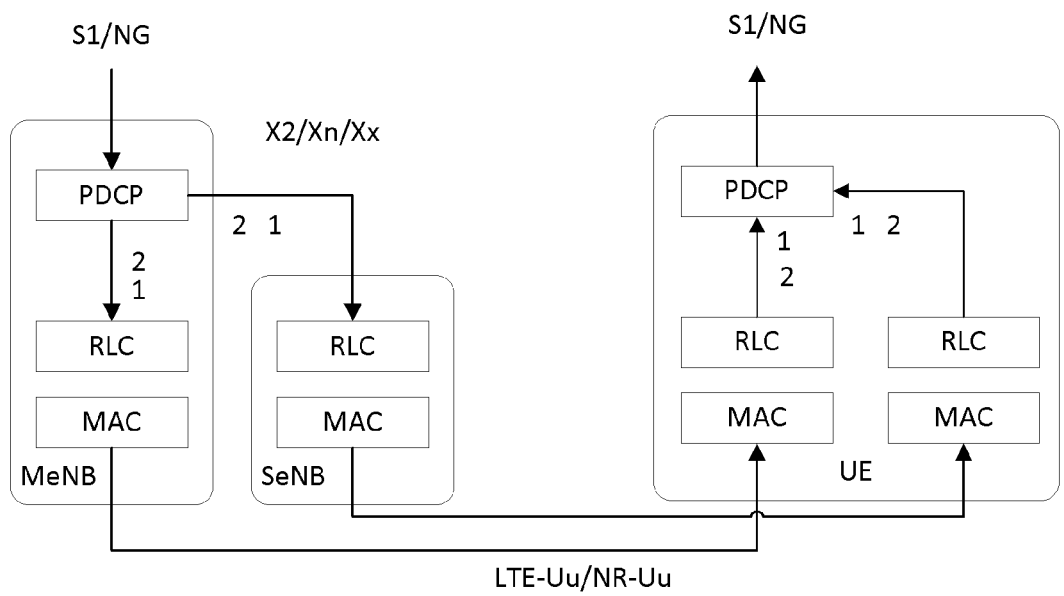
FIG. 1 is a schematic diagram illustrating data transmission of an MCG packet duplication split DRB.

The following describes the present disclosure in detail with reference to the accompanying drawings and specific embodiments. Note that the present disclosure should not be limited to the specific embodiments described below. In addition, for simplicity, detailed description of the known art not directly related to the present disclosure is omitted to prevent confusion in understanding the present disclosure.

Some terms involved in the present disclosure are described below. If not specifically indicated, the terms involved in the present disclosure use the definitions herein. The terms given in the present disclosure may be named differently in NR, LTE, and eLTE, but unified terms are used in the present disclosure. When applied to a specific system, the terms may be replaced with terms used in the corresponding system.

RRC: Radio Resource Control.

PDCP: Packet Data Convergence Protocol. In the present disclosure, if not specifically indicated, the PDCP may represent a PDCP of NR or LTE or eLTE.

RLC: Radio Link Control. In the present disclosure, if not specifically indicated, the RLC may represent RLC of NR or LTE or eLTE.

MAC: Medium Access Control. In the present disclosure, if not specifically indicated, the MAC may represent MAC of NR or LTE or eLTE.

DTCH: Dedicated Traffic Channel.

CCCH: Common Control Channel.

DCCH: Dedicated Control Channel.

PDU: Protocol Data Unit.

SDU: Service Data Unit.

In the present disclosure, data received from or transmitted to an upper layer is referred to as an SDU, and data transmitted to or received from a lower layer is referred to as a PDU. For example, data received from or transmitted to an upper layer by a PDCP entity is referred to as a PDCP SDU; and data received from or transmitted to an RLC entity by the PDCP entity is referred to as a PDCP PDU (i.e., an RLC SDU).

Master Base Station: Master eNB, denoted as MeNB (a base station corresponding to E-UTRAN or Long Term Evolution (LTE) or eLTE) or MgNB (a base station corresponding to 5G-RAN or NR), which refers to a base station that at least terminates at a control node mobility management entity (which can be denoted as S1-MME) for processing interaction between UE and a core network in multi-connection. In the present disclosure, master base stations are all denoted as MeNBs. Note that all embodiments or definitions applicable to the MeNB are also applicable to the MgNB.

Secondary Base Station: Secondary eNB, denoted as SeNB (a base station corresponding to E-UTRAN or LTE or eLTE) or SgNB (a base station corresponding to 5G-RAN or NR), which refers to a base station in multi-connection that provides additional radio resources for UE but does not serve as an MeNB. In the present disclosure, secondary base stations are all denoted as SeNBs. Note that all embodiments or definitions applicable to the SeNB are also applicable to the SgNB.

Primary Cell: Primary Cell (PCell). The PCell is a cell that operates on the primary frequency, and is a cell on which UE performs an initial connection establishment procedure or initiates a connection reestablishment procedure or which is designated as a primary cell during a handover procedure. The cell defined in the present disclosure may also be referred to as a carrier.

Primary Secondary Cell: PSCell. The PSCell is an SCG cell used to instruct UE to perform random access during an SCG switching procedure.

Secondary Cell: SCell. The SCell is a cell that operates on the secondary frequency. The cell can be configured after an RRC connection is established and can be used to provide additional radio resources.

Cell Group: Cell Group (CG). The CG is a group of serving cells or carriers associated with a master base station or secondary base station. In the present disclosure, a group of cells associated with a certain logical channel or RLC entity of a packet duplication bearer or a group of cells providing radio resources or data transmission services to a certain logical channel or RLC entity of a packet duplication bearer is referred to as a cell group, where the cell may be a cell configured with an uplink carrier. The cells can also be referred to as serving cells. Note that the cell in the present disclosure may also be referred to as a set of beams.

Master Cell Group: MCG. For UE not configured with multi-connection, the MCG consists of all serving cells; for UE configured with multi-connection, the MCG consists of a subset of serving cells (namely, a group of serving cells associated with an MeNB or MgNB) including a PCell and 0, 1, or more SCells.

Secondary Cell Group: SCG. The SCG is a group of serving cells associated with an SeNB or SgNB in multi-connection. The SCG may include one PSCell, and may also include one or a plurality of SCells.

Multi-Connection: an operation state of UE in an RRC connected state. In the multi-connection, a plurality of cell groups is configured, and the plurality of cell groups comprise one MCG and one or a plurality of SCGs (namely, the UE is connected to a plurality of base stations). If only one MCG (or MeNB or MgNB) and one SCG (or SeNB or SgNB) are configured, then the multi-connection is referred to as dual-connection. That is, the UE in the connected state and having a plurality of receivers and/or transmitters is configured to use EUTRAN and/or 5G-RAN radio resources provided by a plurality of different schedulers; the schedulers may be connected by non-ideal backhaul or ideal backhaul. The multi-connection defined in the present disclosure includes the dual-connection. Multi-connection data transmission modes include, but are not limited to, packet duplication and link selection.

DRB: Data Radio Bearer carrying user plane data, also referred to as a data bearer for short.

SRB: Signaling Radio Bearer. The bearer may be used for transmitting an RRC message and a NAS message or for transmitting only an RRC message and a NAS message. The SRB may comprise SRB0, SRB1, SRB1bis, and SRB2. SRB0 is used for an RRC message using a CCCH logical channel; SRB1 is used for an RRC message using a DCCH logical channel, where the RRC message may include a NAS message; SRB1 is also used for transmitting a NAS message before SRB2 is established. SRB1bis is used for an RRC message and a NAS message adopting DCCH logical channels prior to secure activation, where the RRC message may comprise the NAS message. SRB2 is used for an RRC message and a NAS message using a DCCH logical channel, where the RRC message includes recorded measurement information (or referred to as a measurement log).

The bearer defined in the present disclosure can be either a DRB or an SRB.

Split DRB: a bearer, in multi-connection, of which a wireless protocol is located in an MeNB (or MgNB) and an SeNB (or SgNB) and which uses resources of both the MeNB (or MgNB) and the SeNB (or SgNB). If a PDCP entity of the split DRB is located in a master base station (namely, data arrives at the master base station first and is forwarded by the master base station to a secondary base station to split the data in the master base station), then the split DRB is referred to as an MCG split DRB; if a PDCP entity of the split DRB is located in a secondary base station (namely, data arrives at the secondary base station first and is forwarded by the secondary base station to a master base station to split the data in the secondary base station), then the split DRB is referred to as an SCG split DRB. If not specifically indicated, the split DRB in the present disclosure may be an MCG split DRB or an SCG split DRB. The embodiment of the present disclosure is also applicable to scenarios in which an MCG split DRB and an SCG split DRB are not distinguished, namely, the split DRB is a bearer DRB of which a wireless protocol is located in an MeNB (or MgNB) and an SeNB (or SgNB) and which uses resources of both the MeNB (or MgNB) and the SeNB (or SgNB).

Split SRB: a bearer, in multi-connection, of which a wireless protocol is located in an MeNB (or MgNB) and an SeNB (or SgNB) and which uses resources of both the MeNB (or MgNB) and the SeNB (or SgNB). If a PDCP entity and/or RRC of the split SRB is located in a master base station (namely, signaling, also referred to as data, is forwarded by the master base station to a secondary base station to split the signaling in the master base station), then the split SRB is referred to as an MCG split SRB; if a PDCP entity and/or RRC of the split SRB is located in a secondary base station (namely, signaling, also referred to as data, is forwarded by the secondary base station to a master base station to split the signaling in the secondary base station), then the split SRB is referred to as an SCG split SRB. If not specifically indicated, the split SRB in the present disclosure may be an MCG split SRB or an SCG split SRB. The embodiment of the present disclosure is also applicable to scenarios in which an MCG split SRB and an SCG split SRB are not distinguished, namely, the split SRB is a bearer SRB of which a wireless protocol is located in an MeNB (or MgNB) and an SeNB (or SgNB) and which uses resources of both the MeNB (or MgNB) and the SeNB (or SgNB).

The split bearer defined in the present disclosure can be either a split SRB or a split DRB.

Packet Duplication: also referred to as data duplication or packet duplication or PDCP duplication or PDCP PDU duplication or PDCP SDU duplication or PDCP packet duplication (If not specifically indicated, the data in the present disclosure may be control plane signaling or user plane data, which respectively correspond to signaling of an SRB and data of a DRB). In a multi-connection mode, the same data (or referred to as a packet, i.e., a PDCP PDU or PDCP SDU) is transmitted in serving cells of a plurality of CGs, i.e., the same data is transmitted by using resources provided by both a master base station (or an MCG) and a secondary base station (or an SCG); or, the same data is transmitted respectively to lower layers (or RLC layers) located at the MCG and the SCG; or, a PDCP entity transmits the same PDCP PDU to a plurality of associated lower layer entities (or RLC entities); or, the same data is transmitted via a plurality of different bearers. In a carrier aggregation or single-connection mode, a PDCP entity transmits duplicate (or the same) PDCP PDUs to two or more associated RLC entities (or referred to as lower-layer entities) and/or logical channels, and a MAC entity transmits the PDCP PDUs to a receiving side through different carriers (also referred to as cells or serving cells) or carrier groups; a receiving PDCP entity is responsible for monitoring and deletion of the duplicate PDCP PDUs or SDUs.

Duplicate Logical Channel: In the present invention, logical channels which are associated with the same PDCP entity, are used for transmitting the same data, or correspond to the same packet duplication bearer, are referred to as duplicate logical channels.

Packet Duplication Bearer: a bearer supporting packet duplication in a carrier aggregation or single-connection mode, can be a packet duplication SRB or a packet duplication DRB. One PDCP entity of the bearer is associated with two or more RLC entities, two or more logical channels, and one MAC entity; a transmitting PDCP entity transmits duplicate (or the same) PDCP PDUs to the two or more RLC entities (or referred to as lower-layer entities) and/or two or more logical channels, and a MAC entity transmits the PDCP PDUs to a receiving side through different carriers (namely, cells or serving cells); a receiving PDCP entity discard the duplicate PDCP PDUs or SDUs received from the lower-layer entities.

Packet Duplication Split Bearer: a split bearer supporting packet duplication in a multi-connection mode. In the transmission mode, the same data is transmitted on a plurality of wireless protocols of the split bearer, including an MCG packet duplication split SRB, an SCG packet duplication split SRB, an MCG packet duplication split DRB, and an SCG packet duplication split DRB. If the packet duplication split bearer is an MCG packet duplication split bearer, then a PDCP entity located in a master base station or an MCG is responsible for packet duplication and/or packet de-duplication; if the packet duplication split bearer is an SCG packet duplication split bearer, then a PDCP entity located in a secondary base station or an SCG is responsible for packet duplication (that is, transmitting PDCP PDUs to two or more RLC entities) and/or packet de-duplication.

Note that, if not specifically stated, the term "packet duplication bearer" used in the present invention can be above-mentioned packet duplication bearer or packet duplication split bearer.

rlc-Config information element: including configuration information of an RLC entity corresponding to an SRB and a DRB.

logicalChannelIdentity information element: a logical channel identity.

logicalChannelConfig information element: including parameters used for configuring a logical channel.

FIG. 1 is a schematic diagram illustrating downlink transmission of an MCG packet duplication split DRB between a base station and user equipment (UE) in dual-connection. It should be understood that uplink transmission of the MCG packet duplication split DRB between the base station and the UE can adopt the same protocol architecture, except that data is transmitted from the UE to the base station, that is, the arrows in FIG. 1 are reversed. As shown in FIG. 1, data (for example, a Packet Data Convergence Protocol protocol data unit (PDCP PDU)) is transmitted over a plurality of wireless protocols (corresponding to a plurality of RLC entities associated with the same PDCP entity) of the split DRB by using resources of an MeNB and an SeNB. In a PDCP PDU data duplication multi-connection mode, each PDCP PDU is transmitted to a receiving party through a plurality of RLC entities. An interface between the MeNB and the SeNB may be denoted as Xn, Xx, or X2. The interface may be named differently according to different types of the MeNB and the SeNB. For example, the interface is denoted as Xx if the MeNB is an LTE eNB and the SeNB is a gNB; or the interface is denoted as Xn if the MeNB is a gNB and the SeNB is an eLTE eNB. Accordingly, an MCG packet duplication split SRB adopts a similar protocol architecture, and the difference lies in that an upper-layer entity transmitting data to a PDCP entity is RRC, and the PDCP entity receives data from a lower-layer entity and then transmits the data to the RRC entity on the upper layer.

Figure 2:
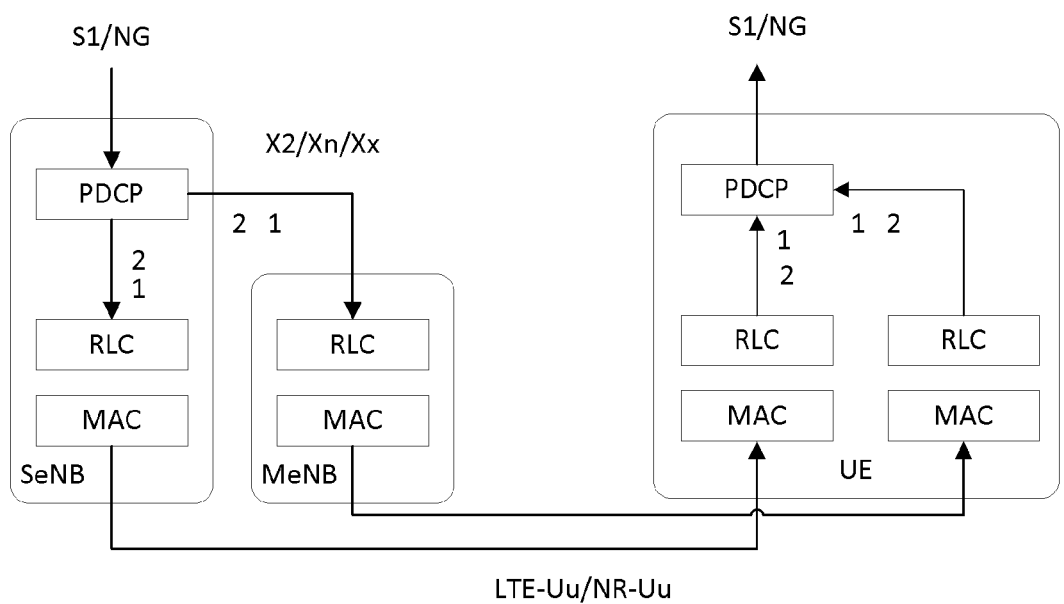
FIG. 2 is a schematic diagram illustrating data transmission of an SCG packet duplication split DRB.

FIG. 2 is a schematic diagram illustrating downlink transmission of an SCG packet duplication split DRB between a base station and user equipment (UE) in dual-connection. It should be understood that uplink transmission of the SCG packet duplication split DRB between the base station and the UE can adopt the same protocol architecture, except that data is transmitted from the UE to the base station, that is, the arrows in FIG. 2 are reversed. As shown in FIG. 2, data (for example, a Packet Data Convergence Protocol protocol data unit (PDCP PDU)) is transmitted over a plurality of wireless protocols (corresponding to a plurality of RLC entities associated with the same PDCP entity) of a split DRB by using resources of an MeNB and an SeNB. In a PDCP PDU data duplication multi-connection mode, each PDCP PDU is transmitted to a receiving party through a plurality of RLC entities. An interface between the MeNB and the SeNB may be denoted as Xn, Xx, or X2. The interface may be named differently according to different types of the MeNB and the SeNB. For example, the interface is denoted as Xx if the MeNB is an LTE eNB and the SeNB is a gNB; or the interface is denoted as Xn if the MeNB is a gNB and the SeNB is an eLTE eNB. Accordingly, an SCG packet duplication split SRB adopts a similar protocol architecture, and the difference lies in that an upper-layer entity transmitting data to a PDCP entity is an RRC entity, and the PDCP entity receives data from a lower-layer entity and then transmits the data to the RRC entity on the upper layer.

Some embodiments of the present disclosure use repeatedly transmitting a data packet PDCP PDU or SDU twice as an example (that is, one PDCP entity is associated with two RLC entities and/or two logical channels). However, the technical solution in the present disclosure is not limited to the scenario of repeatedly transmitting a data packet PDCP PDU or SDU twice, and those skilled in the art can easily expand the technical solution to scenarios of repeatedly transmitting a data packet many times (that is, one PDCP entity is associated with a plurality of RLC entities and/or a plurality of logical channels).

Figure 3:
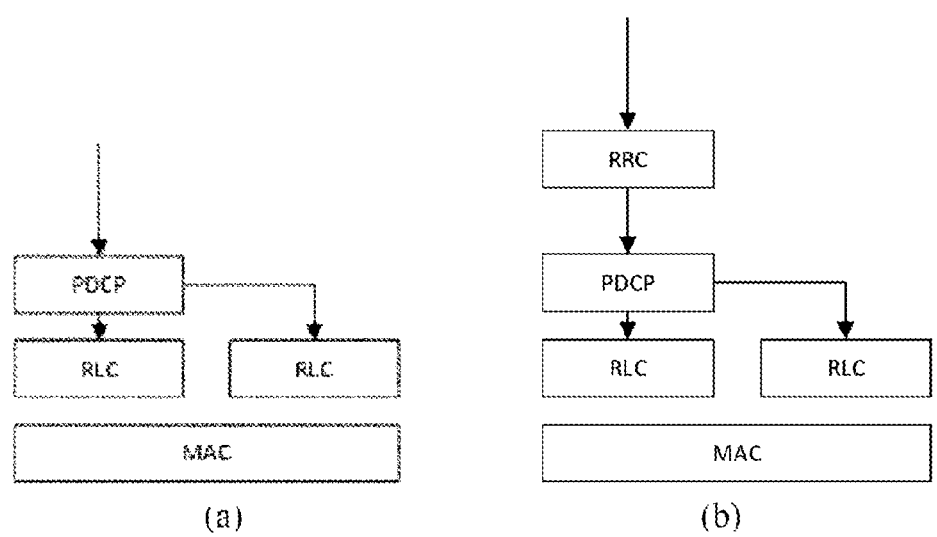
FIG. 3 is a schematic diagram of a protocol architecture of a packet duplication bearer in a carrier aggregation scenario.

FIG. 3 is a schematic diagram of a protocol architecture of a packet duplication bearer in a carrier aggregation scenario. In the schematic diagram shown in FIG. 3(a), a PDCP entity of a DRB is associated with two RLC entities and two logical channels, and one MAC entity. In the schematic diagram shown in FIG. 3(b), an RRC entity and a PDCP entity of an SRB are associated with two RLC entities and two logical channels, and one MAC entity.

Figure 4:
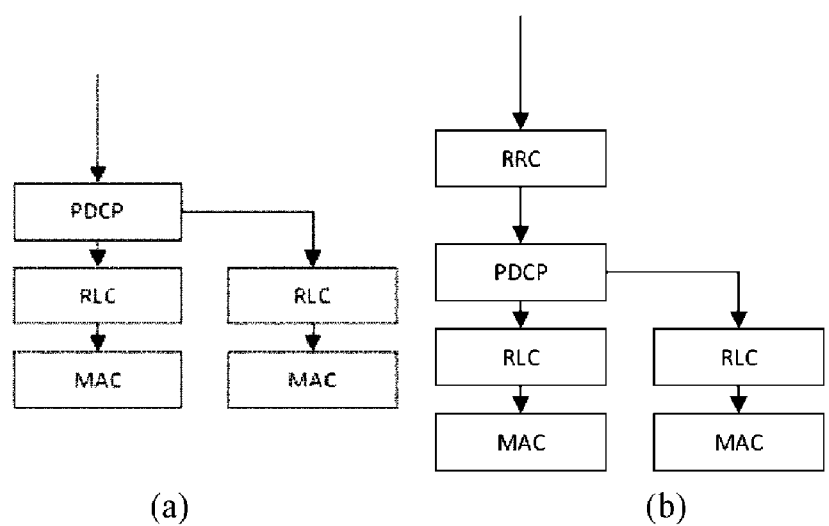
FIG. 4 is a schematic diagram of a protocol architecture of a packet duplication bearer in a dual-connection scenario.

FIG. 4 is a schematic diagram of a protocol architecture of a packet duplication bearer in a dual-connection scenario. In the schematic diagram shown in FIG. 4(a), a PDCP entity of a DRB is associated with two RLC entities and two logical channels, and two MAC entities. In the schematic diagram shown in FIG. 4(b), an RRC entity and a PDCP entity of an SRB are associated with two RLC entities and two logical channels, and two MAC entities.

The following provides an embodiment in which a base station configures a serving cell/cell group of a packet duplication bearer for User Equipment (UE).

Figure 5:
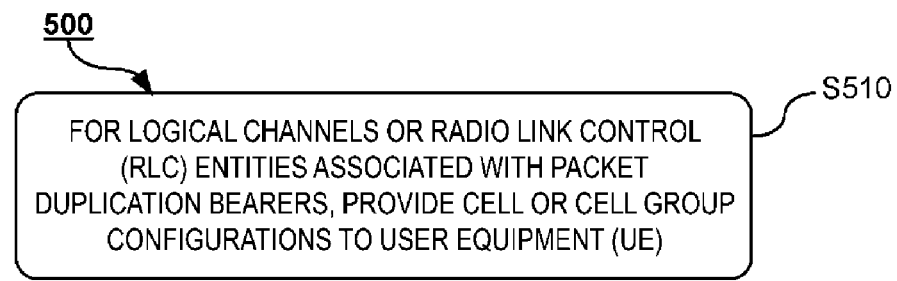
FIG. 5 is a flowchart of a method used in a base station according to an embodiment of the present disclosure.

FIG. 5 is a flowchart of a method 500 used in a base station according to an embodiment of the present disclosure. As shown in the figure, the method 500 comprises the following steps.

In step S510, for logical channels or Radio Link Control (RLC) entities associated with packet duplication bearers, cell or cell group configurations are provided to User Equipment (UE), where each cell or cell group configuration comprises two or more cells or cell groups.

Figure 9:
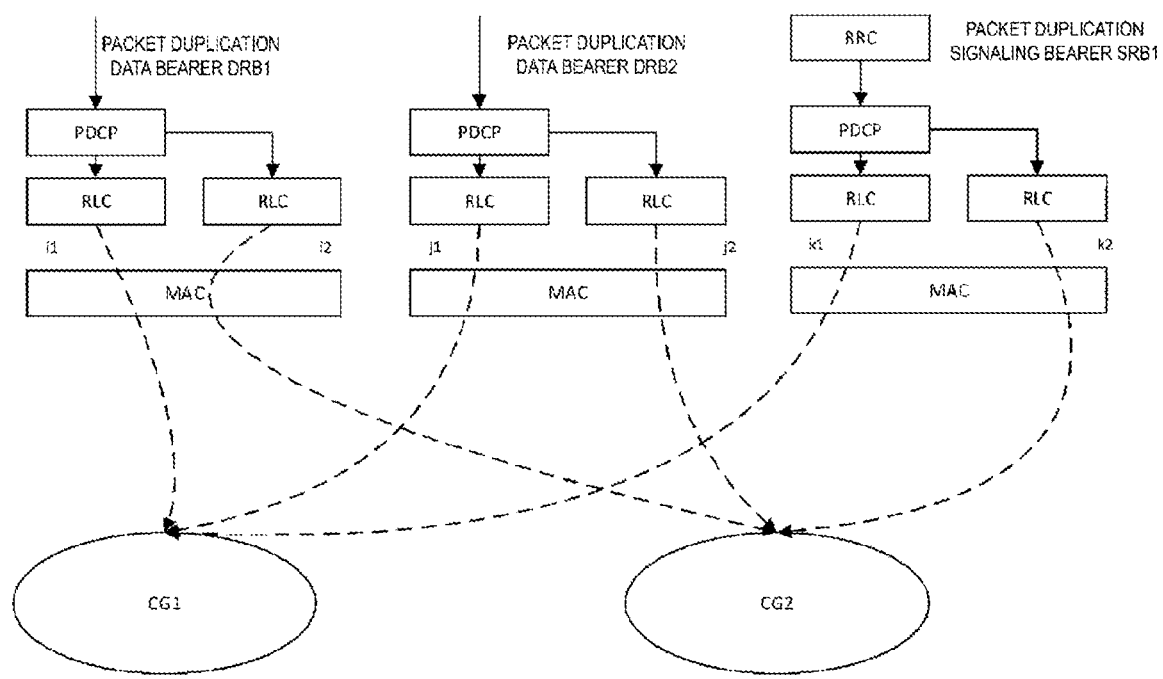
FIG. 9 shows an example in which the same cell group is configured for logical channels (or RLC entities) of different packet duplication bearers.

In an example, logical channels or RLC entities associated with two or more packet duplication bearers have the same cell or cell group configuration. For example, the same cell or cell group configuration can be configured for logical channels (or RLC entities) of different packet duplication bearers. Namely, logical channels (or RLC entities) from different packet duplication bearers are associated with the same cell or cell group configuration; or, the same cell or cell group configuration serves logical channels from different packet duplication bearers; or, logical channels (or RLC entities) from different packet duplication bearers share the same cell or cell group configuration; or, data of logical channels (or RLC entities) from different packet duplication bearers is transmitted via the same cell or cell group configuration. For example, it is assumed that a packet duplication bearer B1 and a packet duplication bearer B2 are present. The packet duplication bearer B1 is associated with a logical channel C1 and a logical channel C2; the packet duplication bearer B2 is associated with a logical channel C3 and a logical channel C4. According to this example, (C1, C2) and (C3, C4) can have the same cell or cell group configuration. For example, C1 and C2 can be respectively associated with a cell CE1 and a cell CE2; C3 and C4 can also be respectively associated with the cell CE1 and the cell CE2. In another example, FIG. 9 shows an example where the same cell group is configured for logical channels (or RLC entities) of different packet duplication bearers. In FIG. 9, a base station configures, for UE, packet duplication bearers DRB1, DRB2, and SRB1; logical channel identities of two logical channels configured for the DRB1 are i1 and i2; logical channel identities of two logical channels configured for the DRB2 are j1 and j2; and logical channel identities of two logical channels configured for the SRB1 are k1 and k2. In addition, two cell groups CG1 and CG2 are configured for the packet duplication bearers; the CG1 is associated with the logical channels i1, j1, and k1, and the CG2 is associated with the logical channels i2, j2, and k2. In this example, the cell or cell group configuration is UE-specific. The base station only needs to configure two cells or cell groups for all of packet duplication bearers of the UE. The base station can configure the cells or cell groups for the UE via RRC signaling. Optionally, it is predefined that a PCell is contained in one of the configured cell groups.

Note that in the present invention, the description "logical channels (or RLC entities) are associated with cells or cell groups (or, cells or cell groups are associated with logical channels or RLC entities)" can be replaced with "cells or cell groups serve logical channels, or data from logical channels is transmitted via cells or cell groups" etc. "Logical channels are associated with cells or cell groups" can be replaced with "RLC entities are associated with cells or cell groups."

Figure 10:
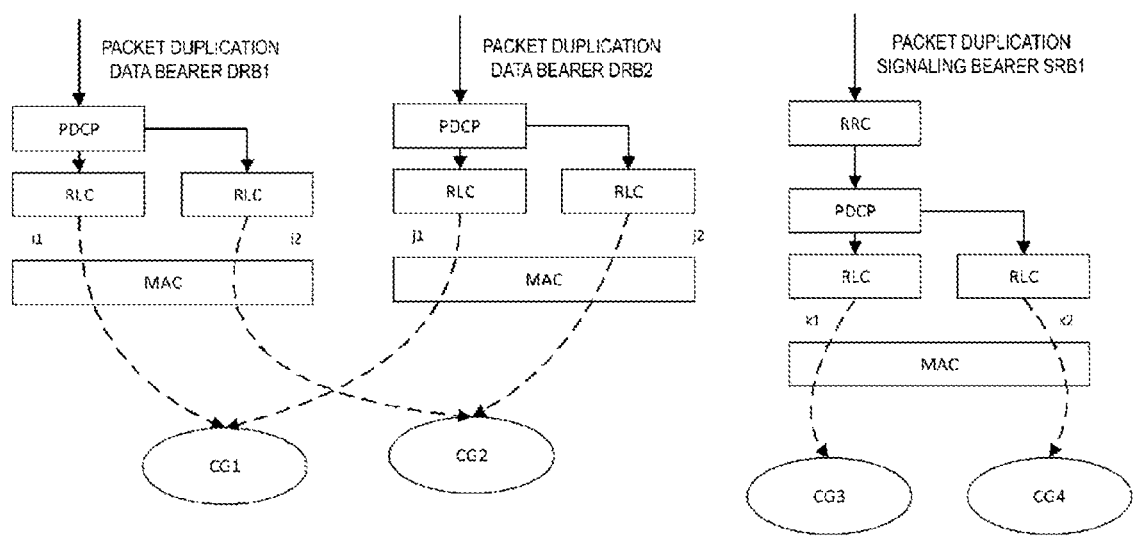
FIG. 10 shows an example in which different cell groups are configured for a packet duplication data bearer and a packet duplication signaling bearer.

Alternatively, the packet duplication bearers include a packet duplication data bearer and a packet duplication signaling bearer, and the packet duplication data bearer and the packet duplication signaling bearer have different cell or cell group configurations. For example, different cells or cell groups are configured for the packet duplication data bearer and the packet duplication signaling bearer. For example, it is assumed that a packet duplication data bearer B1 and a packet duplication signaling bearer B2 are present. The packet duplication data bearer B1 is associated with a logical channel C1 and a logical channel C2; the packet duplication signaling bearer B2 is associated with a logical channel C3 and a logical channel C4. According to this example, (C1, C2) and (C3, C4) can have different cell or cell group configurations. For example, C1 and C2 can be respectively associated with a cell CE1 and a cell CE2; C3 and C4 can be respectively associated with a cell CE3 and a cell CE4. For example, FIG. 10 shows an example in which different cell groups are configured for a packet duplication data bearer and a packet duplication signaling bearer. In FIG. 10, a base station configures, for UE, packet duplication bearers DRB1, DRB2, and SRB1; logical channel identities of two logical channels configured for the DRB1 are i1 and i2; logical channel identities of two logical channels configured for the DRB2 are j1 and j2; and logical channel identities of two logical channels configured for the SRB1 are k1 and k2. In addition, two cell groups CG1 and CG2 are configured for the packet duplication data bearers; the CG1 is associated with the logical channels i1 and j1, and the CG2 is associated with the logical channels i2 and j2. Two cell groups CG3 and CG4 are configured for the packet duplication signaling bearers; the CG3 is associated with the logical channel k1; and the CG4 is associated with the logical channel k2. In this example, a cell or cell group configuration is bear type-specific. The base station only needs to configure two cells or cell groups for the two types of bearers, namely the packet duplication data bearer and the packet duplication signaling bearer, of the UE. Optionally, it is predefined that a PCell is contained in one of the configured cell groups.

Figure 11:
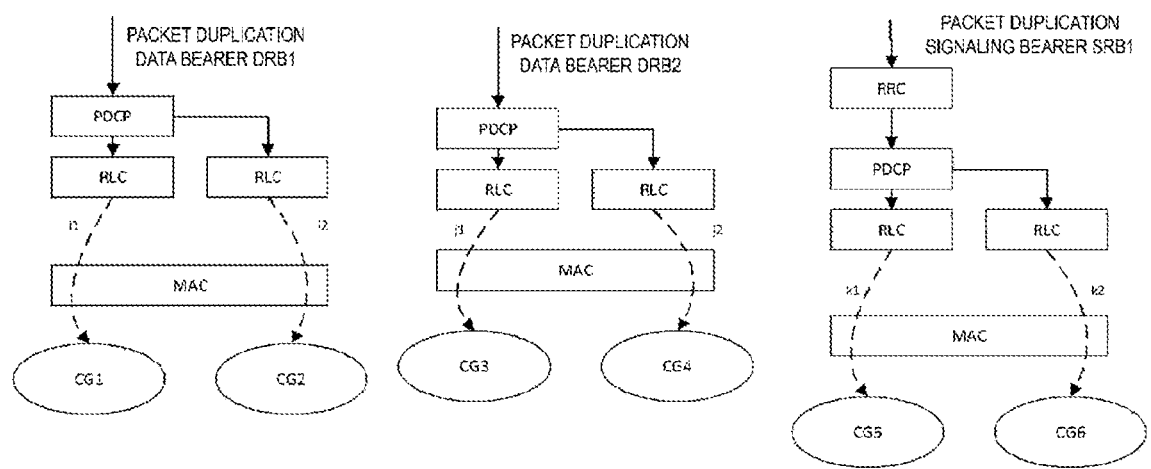
FIG. 11 shows an example in which cell groups are respectively configured for logical channels of different packet duplication bearers.

Alternatively, a cell or cell group configuration of logical channels or RLC entities associated with each packet duplication bearer is separately provided. For example, a cell or cell group is separately configured for logical channels (or RLC entities) of each packet duplication bearer; namely, logical channels (or RLC entities) from different packet duplication bearers can be associated with different cell or cell group configurations. In this embodiment, a cell or cell group configuration is bearer-specific. The base station needs to configure two cells or cell groups for each packet duplication bearer in the UE, and each logical channel is associated with one cell or cell group. Optionally, it is predefined that a PCell is contained in one of the configured cell groups. For example, FIG. 11 shows an example in which cell groups are respectively configured for logical channels of different packet duplication bearers. In FIG. 11, a base station configures, for UE, packet duplication bearers DRB1, DRB2, and SRB1; logical channel identities of two logical channels configured for the DRB1 are i1 and i2; logical channel identities of two logical channels configured for the DRB2 are j1 and j2; and logical channel identities of two logical channels configured for the SRB1 are k1 and k2. In addition, if two cell groups CG1 and CG2 are configured for the packet duplication bearer DRB1, then the CG1 is associated with the logical channel i1, and the CG2 is associated with the logical channel i2; if two cell groups CG3 and CG4 are configured for the packet duplication bearer DRB2, then the CG3 is associated with the logical channel j1, and the CG4 is associated with the logical channel j2; if two cell groups CG5 and CG6 are configured for the packet duplication bearer SRB1, then the CG5 is associated with the logical channel k1, and the CG6 is associated with the logical channel k2.

How cell or cell group configurations associated with logical channels of packet duplication bearers are configured for UE in the method 500 is described in detail through the following examples.

Example 1: Each Logical Channel of a Packet Duplication Bearer (or PDCP Entity) is Associated with One Cell (or Carrier)

In this example, one cell is configured for each logical channel corresponding to the same packet duplication bearer. In carrier aggregation, a PCell can be configured by default to be associated with a logical channel having a smaller, smallest, larger, or largest logical channel identity (or an RLC entity corresponding to the logical channel). Data from the logical channel having the smaller, smallest, larger, or largest logical channel identity can be transmitted via the PCell. In dual-connection, a PCell and a PSCell can be respectively configured by default for two logical channels. Data from a logical channel corresponding to a packet duplication split bearer can be transmitted via only a corresponding PCell or PSCell.

Example 2: Each Logical Channel of a Packet Duplication Bearer (or PDCP Entity) is Associated with One Cell Group (or Carrier Group)

In this example, for each packet duplication bearer, each cell in a cell set pre-configured for the UE is associated with one of logical channels associated with the packet duplication bearer, where the providing cell group configurations to UE includes: for one logical channel associated with the packet duplication bearer, explicitly configuring a first cell group for the UE so that a cell in the set and not contained in the first cell group is contained by default in a second cell group configured for another logical channel associated with the packet duplication bearer. Optionally, the cell contained in the second cell group is a cell that is in the cell set pre-configured for the UE, not contained in the first cell group, and configured with an uplink carrier.

For example, each cell (or each cell configured with an uplink carrier) pre-configured for the UE is necessarily associated with a certain logical channel of one packet duplication bearer. On the basis of this embodiment, it is possible to explicitly configure only one cell group for the UE, and a cell not contained in the configured cell group (or a cell not contained in the configured cell group and is configured with an uplink carrier) is contained by default in another cell group. If not specifically stated, in the present disclosure an explicitly configured cell group is referred to as a first cell group, and a cell group configured by default is referred to as a second cell group.

The first cell group can be explicitly configured in the following specific modes:

Mode I: For each cell, an identity is used to indicate a cell group to which the cell belongs or a logical channel with which the cell is associated.

In this embodiment, one indicator is used to indicate a cell group to which each cell belongs, a cell group configured for a packet duplication bearer, a cell group configured for a duplicate logical channel, or a cell group associated with a duplicate logical channel, and one cell group can be formed by cells of which indicators have the same value or cells of which cell configuration information carries the indicator. For example, all cells of which the values of indicators are "1" or "setup" or "TRUE"; or cells of which cell configuration information carries the indicator form one cell group (referred to as the first cell group); and all cells of which the values of indicators are "0" or "FALSE" or cells not carrying the indicator form another cell group (referred to as the second cell group). The indicator can be transmitted via RRC signaling. For example, the indicator (which can be denoted as servingLogicalChannelIdication) is carried in an information element (for example, information element SCellToAddMod or RadioResourceConfigCommonSCell) where a cell configured for the UE is located. The first cell group is associated with a logical channel having a smaller, smallest, larger, or largest logical channel identity of one packet duplication bearer, data from the logical channel having the smaller, smallest, larger, or largest logical channel identity is transmitted via the first cell group. The second cell group is associated with another logical channel of the packet duplication bearer or data of another logical channel is transmitted via the second cell group.

Optionally, the PCell belonging to the first cell group or the second cell group is configured by default or predefined. Optionally, RRC signaling carries a second indicator to indicate that the PCell is located in the first cell group or the second cell group. For example, an RRC reconfiguration message carries the second indicator.

The following provides schematic descriptions of the indicator in a protocol:

Schematic description I:
```
SCellToAddMod ::=            SEQUENCE {
    sCellIndex                              SCellIndex,
    servingLogicalChannelIdication          ENUMERATED {setup}
    configuration                           SEQUENCE {
        cellIdentification                  SEQUENCE {
            physCellID                      PhysCellId,
            dl-CarrierFreq                  ARFCN-ValueEUTRA
        }                                                              OPTIONAL,            -- Cond SCellAdd
        radioResourceConfigCommonSCell      RadioResourceConfigCommonSCell    OPTIONAL,    -- Cond SCellAdd
        radioResourceConfigDedicatedCell0   RadioResourceConfigDedicatedSCell OPTIONAL,    -- Cond SCellAdd2
        ...
        [[  dl-CarrierFreq                  ARFCN-ValueEUTRA      OPTIONAL     -- Cond EARFCN-max
        ]],
        [[  antennaInfoDedicatedSCell       AntennaInfoDedicated  OPTIONAL     -- Need ON
        ]]
    }
}
```

Schematic description II:
```
RadioResourceConfigCommonSCell::=    SEQUENCE {
    -- DL configuration as well as configuration applicable for DL and UL
    nonUL-Configuration                 SEQUENCE {
        -- 1: Cell characteristics
        dl-Bandwidth                    ENUMERATED (n6, n15, n25, n50, n75, n100),
        -- 2: Physical configuration, general
        antennaInfoCommon               AntennaInfoCommon,
        mbsfn-SubframeConfigList        MRSFN-SubframeConfigList      OPTIONAL,           -- Need OR
        -- 3: Physical configuration, control
        phich-Config                    PHICH-Config,
        -- 4: Physical configuration, physical channels
        pdsch-ConfigCommon              PDSH-ConfigCommon,
        tdd-Config                      TDD-Config                    OPTIONAL            -- Cond TDDSCell
    },
    -- UL configuration
    ul-Configuration                    SEQUENCE {
        servingLogicalChannelIdeation   ENUMERATED (setup)
        ul-FreqInfo                     SEQUENCE {
            ul-CarrierFreq              ARFCN-ValueEUTRA                OPTIONAL,        -- Need OP
            ul-Bandwidth                ENUMERATED (n6, n15,
                                                   n25, n50, n75, n100) OPTIONAL,
            additionalSpectrumEmissionSCell  AdditionalSpectrumEmission
        },
```

| | -continued | | |
|---|---|---|---|
| OP | p-Max<br>uplinkPowerControlCommonSCell-r10<br>-- A special version of IE UplinkPowerControlCommon may be introduced<br>-- 3: Physical configuration, control<br>soundingRS-UL-ConfigCommon<br>ul-CyclicPrefixLength<br>-- 4: Physical configuration, physical channels<br>prach-ConfigSCell | P-Max<br>UplinkPowerControlCommonSCell-r10,<br><br>SoundingRS-UL-ConfigCommon,<br>UL-CyclicPrefixLength,<br><br>PRACH-ConfigSCell | OPTIONAL, -- Need<br><br><br><br><br><br>OPTIONAL, -- Cond |
| TDD-OR-NoR11 | | | |

If a bearer type-specific cell group configuration mode is adopted, then different cell groups can be configured for a packet duplication data bearer and a packet duplication signaling bearer; two indicators can be defined, where one indicator is used for dividing cells configured for UE into two cell groups associated with duplicate logical channels of packet duplication data bearers, and the other indicator is used for dividing cells configured for UE into two cell groups associated with duplicate logical channels of packet duplication data bearers. Values of the two indicators, the method of acquiring cell groups by division according to the two indicators, the method of associating cell groups with duplicate logical channels, and the PCell configuration method are the same as those in the above case where one indicator is defined and are not described herein again.

Mode II: For each cell, a bitmap or a logical channel list is used to indicate a cell group to which the cell belongs or a logical channel with which the cell is associated.

In this mode, a bitmap or a logical channel list is used to indicate a logical channel associated with each cell. The bitmap or the logical channel list can be transmitted via RRC signaling. For example, the bitmap or the logical channel list is contained in an information element (denoted as SCellToAddMod) for adding/modifying an SCell for UE. Each bit in the bitmap corresponds to one logical channel, and when the value of a corresponding bit of a logical channel in the bitmap is 1 (or the value of the corresponding bit in the bitmap is 0), the cell is associated with the logical channel. Preferably, the length of the bitmap is the number of logical channels configured for the UE or the maximum number of logical channels that can be configured for the UE. Alternatively, the length of the bitmap is the number of duplicate logical channels configured for the UE or the maximum number of duplicate logical channels that can be configured for the UE. If the SCellToAddMod carries the logical channel list, then a cell configured in the SCellToAddMod is associated with a logical channel indicated in the logical channel list.

Optionally, the PCell belonging to a cell group is configured by default or predefined, the cell group where a logical channel having a smaller, smallest, larger, or largest logical channel identity corresponding to each packet duplication bearer is located. Optionally, RRC signaling carries a bitmap or a logical channel list to indicate a logical channel associated with the PCell. For example, an RRC reconfiguration message carries the bitmap or the logical channel list:

```
Schematic description I:
SCellToAddMod ::=           SEQUENCE {
   sCellIndex                    SCellIndex,
   servingLogicalChannelBitmap   BIT STRING(SIZE 8)              OPTIONAL cond UL
configuration           ----bitmap
   cellIdentifiaction            SEQUENCE {
      physCellId                    PhysCellId,
      dl-CarrierFreq                ARFCN-ValueEUTRA
   }
   SCellAdd
      radioresourceConfigCommonSCell          RadioResourceCommonSCell          OPTIONAL,        -- Cond
   SCellAdd
      radioResourceConfigDedicatedSCell0      RadioResourceConfigDedicatedSCell OPTIONAL,        -- Cond
Cond SCellAdd2
   ...,
   [[
   ]],
   [[
   ]]
}

Schematic description II:
RadioResourceConfigCommonSCell::=   SEQUENCE {
   -- DL configuration as well as configuration applicable for DL and UL
   nonUL-Configuration              SEQUENCE {
      -- 1: Cell characteristics
      dl-Bandwidth                  ENUMERATED (n6, n15, n25, n50, n75, n100),
      -- 2: Physical configuration, general
      antennaInfoCommon             AntennaInfoCommon,
      mbsfn-SubframeConfigList      MBSFN-SubframeConfigList                    OPTIONAL,        -- Need
OR
      -- 3: Physical configuration, control
      phich-Config                  PHICH-Config,
      -- 4: Physical configuration, physical channels
      pdsch-ConfigCommon            PDSCH-ConfigCommon,
      tdd-Config                    TDD-Config                                  OPTIONAL,        -- Cond
TDDSCell
   },
   -- UL configuration
   ul-Configuration                 SEQUENCE {
      servingLogicalChannelsBitmap  BIT STRING(SIZE 8)           OPTIONAL        ----bitmap
      ul-FreqInfo                   SEQUENCE {
         ul-CarrierFreq             ARFCN-ValueEUTRA                             OPTIONAL,       -- Need
OP
         ul-Bandwidth               ENUMERATED (n6, n15
                                                n25, n50, n75, n100)            OPTIONAL,
         AdditionalSpectrumEmissionSCell    AdditionalSpectrumEmission
Need OP
      },
      p-Max                         P-Max                                       OPTIONAL,        -- Need
OP
      uplinkPowerControlCommonSCell-r10   UplinkPowerControlCommonSCell-r10
      -- A special version of IE UplinkPowerControlCommon may be introduced
```

-continued

```
                -- 3: Physical configuration, control
            soundings-UL-ConfigCommon    Soundings-UL-ConfigCommon,
            ul-CyclicPrefixLength        UL-CyclicPrefixLength,
                -- 4: Physical configuration, physical channels
            prach-ConfigSCell            PRACH-ConfigSCell            OPTIONAL,         -- Cond TDD-OR-Nor11
    Schematic description III:
SCellToAddMod ::=    SEQUENCE {
    sCellIndex                              SCellIndex,
    servingLogicalChannelList               SEQUENCE (SIZE (1..maxlogicalchannelidentity)) OF
                                            ---logical channel list
    logicalchannelidentity                  OPTIONAL cond UL configuration
    cellidentification                      SEQUENCE {
        physCellId                              PhysCellId,
        dl-CarrierFreq                          ARFCN-ValueEUTRA
    }                                                                                    OPTIONAL,         -- Cond
SCellAdd
    radioResourceConfigCommonSCell          RadioResourceConfigCommonSCell               OPTIONAL,         -- Cond
SCellAdd
    radioResourceConfigDedicatedSCell0      RadioResourceConfigDedicatedSCell            OPTIONAL,
Cond SCellAdd2
    ...,
    [[  dl-CarrierFreq                      ARFCN-ValueEUTRA          OPTIONAL          -- Cond EARFCN-max
    ]],
    [[  antennaInfoDedicatedSCell           AntennaInfoDedicated      OPTIONAL                            -- Need ON
    ]]
}
    Schematic description IV:
RadioResourceConfigCommonSCell::=           SEQUENCE {
    -- DL configuration as well as configuration applicable for DL and UL
    nonUL-Configuration                     SEQUENCE {
        -- 1: Cell characteristics
        dl-Bandwidth                            ENUMERATED (n6, n15, n25, n50, n75, n100),
        -- 2: Physical configuration, general
        antennaInfoCommon                       AntennaInfoCommon,
        mbsfn-SubframeConfigList                MBSFN-SubframeConfigList                 OPTIONAL,         -- Need
OR
        -- 3: Physical configuration, control
        phich-Config                            PHICH-Config,
        -- 4: Physical configuration, physical channels
        pdsch-ConfigCommon                      PDSCH-ConfigCommon,
        tdd-Config                              TDD-Config                               OPTIONAL          -- Cond
TDDSCell
    },
    -- UL configuration
    ul-Configuration                        SEQUENCE {
        servingLogicalChannelList               SEQUENCE (SIZE (1..maxlogicalchannelidentity)) OF
                                                ---logical channel list
        logicalchannelidentity                  OPTIONAL
OP
        ul-FreqInfo                             SEQUENCE {
            ul-CarrierFreq                          ARFCN-ValueEUTRA                     OPTIONAL,         -- Need
OP
            ul-Bandwidth                            ENUMERATED (n6, n15,
                                                    n25, n50, n75, n100)                 OPTIONAL,
Need OP
```

-continued

| | | | |
|---|---|---|---|
| | additionalSpectrumEmissionSCell | AdditionalSpectrumEmission | |
| | }, | | |
| OP | p-Max | P-Max OPTIONAL, | -- Need |
| | uplinkPowerControlCommonSCell-r10 | UplinkPowerControlCommonSCell-r10, | |
| | -- A special version of IE UplinkPowerControlCommon may be introduced | | |
| | -- 3: Physical configuration, control | | |
| | soundingRS-UL-ConfigCommon | SoundingRS-UL-ConfigCommon, | |
| | ul-CyclicPrefixLength | UL-CyclicPrefixLength, | |
| | -- 4: Physical configuration, physical channels | | |
| TDD-OR-NoR11 | prach-ConfigSCell | PRACH-ConfigSCell OPTIONAL, | -- Cond |

If a bearer type-specific cell group configuration mode is adopted, then two bitmaps or two logical channel lists can be defined, and respectively correspond to a packet duplication data bearer and a packet duplication signaling bearer. Preferably, the length of the bitmap corresponding to the packet duplication signaling bearer is the number of signaling bearer logical channels configured for the UE or the maximum number of signaling bearer logical channels that can be configured for the UE; the length of the bitmap corresponding to the packet duplication data bearer is the number of data bearer logical channels configured for the UE or the maximum number of data bearer logical channels that can be configured for the UE. Alternatively, the length of the bitmap corresponding to the packet duplication signaling bearer is the number of packet duplication signaling bearer logical channels configured for the UE or the maximum number of packet duplication signaling bearer logical channels that can be configured for the UE; the length of the bitmap corresponding to the packet duplication data bearer is the number of packet duplication data bearer logical channels configured for the UE or the maximum number of packet duplication data bearer logical channels that can be configured for the UE. If two logical channel lists are configured, then one of the lists is a list of packet duplication data bearer logical channels associated with cells, and the other list is a list of packet duplication signaling bearer logical channels associated with cells. The value of the bitmap, the meaning of the value of the bitmap, the method of associating a cell with a corresponding logical channel, and the PCell configuration method are similar to those in the cases in which one bitmap or one logical channel list is defined, and are not described herein again.

Mode III: For each logical channel associated with each packet duplication bearer, a bitmap is used to indicate a cell(s) with which the logical channel is associated.

In this embodiment, a bitmap is used to indicate a cell group associated with each logical channel of a packet duplication bearer. Each bit of the bitmap indicates one cell, and the length of the bitmap can be the number of cells configured for the UE or the maximum number of cells that can be configured for the UE or the maximum value of a cell identity supported by a system. Cells corresponding to all "1 s" in the bitmap form a cell group (referred to as the first cell group), and cells corresponding to all "0s" in the bitmap form a cell group (referred to as the second cell group). Preferably, the cells indicated by the bitmap do not comprise the PCell. In this case, the first bit (namely the leftmost bit or the rightmost bit) of the bitmap is used to indicate a cell (except the PCell) of which a cell identity (which can be denoted as sCellIndex) is the smallest (for example, "1"), the second bit is used to indicate a cell of which a cell identity is the second smallest (for example, "2"), and so on. In carrier aggregation, it can be predefined or configured by default that the PCell is associated with a logical channel having a smaller, smallest, larger, or largest logical channel identity, or it can be predefined or configured by default that the PCell is contained in a cell group formed by cells corresponding to "i s" (or "0s") in the bitmap or the first cell group or the second cell group. Alternatively, the cells indicated by the bitmap comprise the PCell, and in this case the first bit or the last bit of the bitmap indicates the PCell. If the first bit indicates the PCell, then the second bit indicates the cell (except the PCell) of which the cell identity (which can be denoted as sCellIndex) is the smallest (for example, "1"), the third bit is used to indicate the cell of which the cell identity is the second smallest (for example, "2"), and so on.

The bitmap can be contained in RRC signaling, for example, contained in an RRC reconfiguration message. Further, the bitmap can be contained in RRC signaling used for configuring a packet duplication bearer, for example, contained in an information element such as RadioResourceConfigDedicated, Mac-MainConfig, LogicalChannelConfig, or RLC-Config.

If configuration information RLC-Config and/or LogicalChannelConfig of two RLC entities and/or logical channels of a packet duplication bearer is the same, then the bitmap can also be contained in the configuration information of the RLC entities or logical channels. Preferably, a logical channel corresponding to a logical channel identity in logical channel configuration information is associated with the cell group formed by the cells corresponding to all "1s" (or "0s") in the bitmap; namely, data from a logical channel of which a logical channel identity is a specified value in logical channel configuration information is transmitted via the cell group formed by the cells corresponding to all "1s" (or "0s"). The other logical channel is associated with the cell group formed by the cells corresponding to all "0s" (or "1s"); namely, data from the other logical channel is transmitted via the cell group formed by the cells corresponding to all "0s" (or "1 s"). Alternatively, the cell group formed by cells corresponding to all "1s" in the bitmap is associated with a logical channel having a smaller, smallest, larger, or largest logical channel identity, and the cell group formed by cells corresponding to all "0s" in the bitmap is associated with a logical channel having a larger or largest or smaller or smallest logical channel identity.

If configuration information RLC-Config and/or LogicalChannelConfig of two RLC entities and/or logical channels of a packet duplication bearer is not the same, and the bitmap is contained in a certain logical channel configuration LogicalChannelConfig or RLC configuration RLC-Config of the duplication bearer, then cells corresponding to all "1s" (or "0s") in the bitmap form a cell group; namely, if a configuration of a certain logical channel comprises the bitmap, then the cell group is associated with the logical channel including the bitmap configuration information; namely, data from the logical channel is transmitted via the cell group formed by the cells corresponding to all "1s" (or "0s") in the bitmap. Optionally, if a configuration of a certain logical channel does not comprise the bitmap, then data from the logical channel is transmitted via the cell group formed by the cells corresponding to all "0s" (or "1s") in the bitmap contained in a configuration of the other logical channel. For example, it is assumed that three cells in total are configured for the UE, and corresponding cell identities are 1, 2, and 3. If a logical channel configuration LogicalChannelConfig of a first logical channel associated with a packet duplication bearer comprises a bitmap, and the first and third bits of the bitmap are "1", then data from the first logical channel is transmitted via cells of which cell identities are 1 and 3. If it is assumed that the PCell belonging to the second cell group is predefined, and a logical channel configuration of a second logical channel does not comprise a bitmap, then data from the second logical channel is transmitted via the PCell and a cell of which a cell identity is 2.

The following provides schematic descriptions of the bitmap in a protocol:

```
Exemplary description I:
RadioResourceConfigDedicated ::=     SEQUENCE {
        srb-ToAddModList             SRB-ToAddModList            OPTIONAL,    -- Cond HO-Conn
        drb-ToAddModList             DRB-ToAddModList            OPTIONAL,    -- Cond HO-toEUTRA
        drb-ToReleaseList            DRB-ToReleaseList           OPTIONAL,    -- Need ON
        cellGroupBitmap              BIT STRING(SIZE (8))        OPTIONAL
        mac-MainConfig               CHOICE {
                                        explicitValue       MAC-MainConfig,
                                        defaultValue        NULL
        }                            OPTIONAL,                                -- Cond NO-toEUTRa2
        sps-Config                   SPS-Config                  OPTIONAL,    -- Need ON
        physicalConfigDedicated      PhysicalConfigDedicated     OPTIONAL,    -- Need ON
        ...,
}
        Exemplary description II:
MAC-MainConfig ::=                   SEQUENCE {
        cellGroupBitmap              BIT STRING(SIZE (8))        OPTIONAL
        ul-SCH-Config                SEQUENCE {
            maxHARQ-Tx               ENUMERATED {
                                        n1, n2, n3, n4, n5, n6, n7, n8,
                                        n10, n12, n16, n20, n24, n28,
                                        spare2, spare1)         OPTIONAL,    -- Need ON
            periodicBSR-Timer        PeriodicBSR-Timer-r12       OPTIONAL,    -- Need ON
            retxBSR-Timer            RetxBSR-Timer-r12,
            ttlBundling              BOOLEAN
        }                                                        OPTIONAL,    -- Nee d ON
        drx-Config                   DRX-Config                  OPTIONAL,    -- Need ON
        timeAlignmentTimeDedicated   TimeAlignmentTimer,
        phr-Config                   CHOICE {
            release                      NULL,
            setup                        SEQUENCE {
                periodicPHR-Timer        ENUMERATED (sf10, sf20, sf50, sf100, sf200,
                                                    sf500, sf1000, infinity)
                prohibitPHR-Timer        ENUMERATED (sf0, sf10, sf20, sf50, sf100,
                                                    sf200, sf500, sf1000),
                dl-PathlossChange        ENUMERATED (dB1, dB3, dB6, infinity)
            }
        }                                                        OPTIONAL,    -- Need ON
        ...,
}
        Exemplary description III:
LogicalChannelConfig ::=             SEQUENCE {
            cellGroupBitmap          BIT STRING(SIZE (8))        OPTIONAL
            ul-SpecificParameters    SEQUENCE {
                priority                 INTEGER (1..16),
                prioritisedBitRate       ENUMERATED {
                                            kBps0, kBps8, kBps16, kBps32, kBps64,
                                            kBps128, kBps256, infinity, kBps512-v1020,
                                            kBps1024-v1020, kBps2048-v1020, spare5, spare4, spare3,
                                            spare2, spare1},
                bucketSizeDuration       ENUMERATED {
                                            ms50, ms100, ms150, ms300, ms500, ms1000,
                                            spare2, spare1],
                logicalChannelGroup      INTEGER (0..3)          OPTIONAL    -- Need OR
            }                                                    OPTIONAL,   -- Cond UL
            ...,
}
```

Mode IV: One cell list is configured for each logical channel of a packet duplication bearer.

In this embodiment, a cell list is configured to indicate a cell group associated with each duplicate logical channel. The cell list can be contained in RRC signaling, for example, contained in an RRC reconfiguration message. Further, the cell list can be contained in RRC signaling used for configuring a packet duplication bearer, for example, contained in an information element such as RadioResourceConfigDedicated, Mac-MainConfig, LogicalChannelConfig, or RLC-Config. Cells in the cell list form a cell group, and other cells or other cells configured with uplink carriers form a cell group. Preferably, it can be explicitly specified which cell group the PCell is contained in. If the PCell is contained in the configured cell list, then the PCell and the other cells in the cell list form a cell group; otherwise, the PCell is contained in the other cell group. Alternatively, it is predefined that the PCell is contained in the cell group formed by the cells indicated by the cell list, or it is predefined that the PCell is contained in the cell group formed by the cells not contained in the cell list (or the cells that are not contained in the cell list and are configured with uplink carriers).

The following provides schematic descriptions of the cell list in a protocol:

```
        Exemplary description I:
RadioresourceConfigDedicated ::=        SEQUENCE {
        srb-ToAddModList                SRB-ToAddModList                OPTIONAL,       -- Cond
HO-Conn
        drb-ToAddModList                DRB-ToAddModList                OPTIONAL,       -- Cond
HO-toEUTRA
        drb-ToReleaseList               DRB-ToReleaseList               OPTIONAL,       -- Need
ON
        cellGroupList                   SEQUENCE (SIZE (1..maxSCell)) OF sCellIndex
OPTIONAL
        mac-MainConfig                  CHOICE {
                explicitValue                   MAC-MainConfig,
                defaultValue                    NULL
        }                       OPTIONAL,                                               -- Cond
HO-toEUTRA2
        sps-Config                      SPS-Config                      OPTIONAL,       -- Need
ON
        physicalConfigDedicated         PhysicalConfigDedicated         OPTIONAL,       -- Need
ON
        ...,
}
        Exemplary description II:
MAC-MainConfig ::=      SEQUENCE {
        cellGroupList                   SEQUENCE (SIZE (1..maxSCell)) OF sCellIndex
OPTIONAL
        ul-SCH-Config                   SEQUENCE {
        maxHARQ-TX                              ENUMERATED {
                                                n1, n2, n3, n4, n5, n6, n7, n8,
                                                n10, n12, n16, n20, n24, n28,
                                                spare2, spare1)   OPTIONAL,    -- Need ON
                periodiccBSR-Timer              PeriodicBSR-Timer-r12   OPTIONAL,       -- Need ON
                retxBSR-Timer                   RetxBSR-Timer-r12,
                ttiBundling                     BOOLEAN
                                                        OPTIONAL,       -- Need ON
        }
        drx-Config                      DRX-Config                      OPTIONAL,       -- Need ON
        timeAlignmentTimerDedicated     TimeAlignmentTimer,
        phr-Config                      CHOICE {
                release                         NULL,
                setup                           SEQUENCE {
                        periodicPHR-Timer               ENUMERATED {sf10, sf20, sf50, sf100, sf200,
                                                                sf500, sf1000, infinity},
                        prohibitPHR-Timer               ENUMERATED {sf0, sf10, sf20, sf50, sf100,
                                                                sf200, sf500, sf1000},
                        dl-PathlossChange               ENUMERATED {dB1, dB3, dB6, infinity}
                }
        }                                               OPTIONAL,       -- Need ON
        ...,
}
        Exemplary description III:
LogicalChannelConfig ::=        SEQUENCE {
        cellGroupList                   SEQUENCE (SIZE (1..maxSCell)) OF sCellIndex
OPTIONAL
        ul-SpecificParameters           SEQUNECE {
                priority                        INTEGER (1..16),
                prioritisedBitRate              ENUMERATD {
                                                kBps0, kBps8, kBps16, kBps32, kBps64,
kBps128,
                                                kBps256, infinity, kBps512-v1020,
kBps1024-v1020,
                                                kBps2048-v1020, spare5, spare4, spare3,
spare2,
                                                spare1),
                bucketSizeDuration              ENUMERATED {
                                                ms50, ms100, ms150, ms300, ms500, ms1000,
spare2,
                                                spare1),
                logicalChannelGroup             INTEGER (0..3)          OPTIONAL        --
Need OR
        }       OPTIONAL,                                                               --
Cond UL
        ...,
}
```

When a cell list is used to configure a cell group, a method of associating a logical channel or an RLC entity with a cell group can be a bitmap-like method. In this case, a cell group formed by cells corresponding to "1s" in a bitmap corresponds to a cell group formed by cells indicated by a cell list; a cell group formed by cells corresponding to "0s" in the bitmap corresponds to a cell group formed by cells not indicated in the cell list (or cells that are not indicated in the cell list and are configured with uplink carriers).

Alternatively, for each packet duplication bearer, each cell in a subset of a cell set pre-configured for the UE is associated with one of logical channels associated with the packet duplication bearer, where the providing cell group configurations to UE comprises: for the logical channels associated with the packet duplication bearer, explicitly configuring a first cell group and a second cell group for the UE respectively.

For example, part of cells or part of cells configured with uplink carriers configured for the UE are associated with a certain logical channel of one packet duplication bearer. If the cell group configurations are UE-specific, then two cell groups need to be explicitly configured for the UE, and the two cell groups are respectively associated with logical channels of each packet duplication bearer; if the cell group configurations are bearer type-specific, then four cell groups need to be explicitly configured for the UE, where two of the cell groups are associated with a certain logical channel of each packet duplication data radio bearer, and the other two cell groups are associated with a certain logical channel of each packet duplication signaling radio bearer. If the cell group configurations are bearer-specific, then two cell groups need to be explicitly configured for each packet duplication bearer, and each cell group is associated with a certain logical channel of a corresponding bearer. The method of explicitly configuring one cell group is also applicable to explicitly configuring two cell groups; namely, each of the two cell groups is configured by using the method of configuring the first cell group in the embodiment of explicitly configuring one cell group.

The first cell group or the second cell group can be explicitly configured in the following specific modes. For each cell, an identity is used to indicate a cell group to which the cell belongs or a logical channel with which the cell is associated. Alternatively, for each cell, a bitmap or a logical channel list is used to indicate a cell group to which the cell belongs or a logical channel with which the cell is associated. Alternatively, for each logical channel associated with each packet duplication bearer, a bitmap is used to indicate a cell with which the logical channel is associated.

For example, in mode I: a logical channel identity list (for example, servingLogicalChannelList) is added to an information element (for example, an information element SCellToAddMod or RadioResourceConfigCommonSCell) where a cell configured for the UE is located, and the list is used for indicating a logical channel associated with a corresponding cell, namely, which logical channel of a packet duplication bearer data is from and transmitted via the cell or which logical channel of a packet duplication bearer the cell serves. Alternatively, a bitmap corresponding to logical channel identities (for example, servingLogicalChannelBitmap) is added to an information element (for example, an information element SCellToAddMod or RadioResourceConfigCommonSCell) where a cell configured for the UE is located, and the bitmap is used for indicating a logical channel associated with a corresponding cell, namely, which logical channel of a packet duplication bearer data is from and transmitted via the cell or which logical channel of a packet duplication bearer the cell serves. Each bit in the bitmap corresponds to one logical channel, and when the value of a corresponding bit of a logical channel in the bitmap is 1 (or the value of the corresponding bit in the bitmap is 0), the cell is associated with the logical channel. Preferably, the length of the bitmap is the number of logical channels configured for the UE or the maximum number of logical channels that can be configured for the UE. Alternatively, the length of the bitmap is the number of duplicate logical channels configured for the UE or the maximum number of duplicate logical channels that can be configured for the UE. If the SCellToAddMod carries the logical channel list, then a cell configured in the SCellToAddMod is associated with a logical channel indicated in the logical channel list.

Optionally, the PCell belonging to a cell group is configured by default or predefined, the cell group where a logical channel having a smaller, smallest, larger, or largest logical channel identity corresponding to each packet duplication bearer is located. Optionally, RRC signaling carries a bitmap or a logical channel list to indicate a logical channel associated with the PCell. For example, an RRC reconfiguration message carries the bitmap or the logical channel list.

The following provides schematic descriptions of the logical channel identity list in a protocol:

Exemplary description I:

```
SCellToAddMod ::=        SEQUENCE {
    sCellIndex                      SCellIndex,
    servingLogicalChannelList       SEQUENCE (SIZE (1..maxLogicalChannelIdentity)) OF
logicalChannelIdentity                          OPTIONAL       OPTIONAL cond UL configuration
    cellIdentification              SEQUENCE {
        physCellId                      PhysCellId,
        dl-CarrierFreq                  ARFCS-ValueEUTRA               OPTIONAL,
    }
SCellAdd    radioResourceConfigCommonSCell   RadioResourceConfigCommonSCell        OPTIONAL,   -- Cond
SCellAdd    radioResourceConfigDedicatedSCell0  RadioResourceConfigDedicatedSCell  OPTIONAL,   -- Cond
Cond SCellAdd2
    ...
    [[  dl-CarrierFreq                ARFCN-ValueEUTRA                OPTIONAL     -- Cond RARFCN-max
    ]]
    [[  antennaInfoDedicatedSCell     AntennaInfoDedicated            OPTIONAL     -- Need ON
    ]]
}

Exemplary description II:
RadioResourceConfigCommonSCell::=   SEQUENCE {
    -- DL configuration as well as configuration applicable for DL and UL
    nonUL-Configuration             SEQUENCE {
        -- 1: Cell characteristics
        dl-Bandwidth                    ENUMERATED (n6, n15, n25, n50, n75, n100),
        -- 2: Physical configuration, general
        antennaInfoCommon               AntennaInfoCommon
        mbsfn-SubframeConfigList        MBSFN-SubframeConfigList        OPTIONAL,   -- Need
        -- 3: Physical configuration, control
        phich-Config                    PHICH-Config,
        -- 4: Physical configuration, physical channels
        pdsch-ConfigCommon              PDSCH-ConfigCommon,
OR      tdd-Config                      TDD-Config                      OPTIONAL   -- Cond
TDDSCell
    },
    -- UL configuration
    ul-Configuration                SEQUENCE {
        servingLogicalChannelList       SEQUENCE (SIZE (1..maxLogicalChannelIdentity)) OF
logicalChannelIdentity                      OPTIONAL       OPTIONAL cond UL configuration
        ul-FreqInfo                     SEQUENCE {
            ul-CarrierFreq                  ARFCN-ValueEUTRA                OPTIONAL,   -- Need
OP          ul-Bandwidth                    ENUMERATED (n6, n15,
                                                        n25, n50, n75, n100)  OPTIONAL,
            additionalSpectrumEmissionSCell  AdditionalSpectrumEmission                 -- 
Need OP
        },
        p-Max                           P-Max                           OPTIONAL,   -- Need
OP      uplinkPowerControlCommonSCell-r10  UplinkPowerControlCommonSCell-r10,
```

-continued

```
                                       -- A special version of IE UplinkPowerControlCommon may be introduced
                                       -- 3: Physical configuration, control
            soundingRS-UL-ConfigCommon       SoundingRS-UL-ConfigCommon,
            ul-CyclicPrefixLength            UL-CyclicPrefixLength,
                                       -- 4: Physical configuration, physical channels
            prach-ConfigSCell                PRACH-ConfigSCell           OPTIONAL,           -- Cond
TDD-OR-NoR11
Exemplary description III:
DRB-ToAddMod ::=      SEQUENCE {
      cps-BearerIdentity              INTEGER (0..15)                    OPTIONAL,           -- Cond
DRB-Setup
      drb-Identity                    DRB-Identity,
      drb-Typeduplicate               ENUMERATED (TRUE)                  OPTIONAL
      pdcp-Config                     PDCP-Config                        OPTIONAL,           -- Cond
PDCP
      rlc-Config                      RLC-Config                         OPTIONAL,           -- Cond SetupM
      logicalChannelIdentity          INTEGER (3..10)                    OPTIONAL,           -- Cond
DRB-SetupM
      logicalChannelIdentityDuplicate INTEGER
                                      OPTIONAL,                                              -- Cond DRB-SetupM
      servingCellGroup1               bitmap Optional
      servingCellGroup2               bitmap Optional
      logicalChannelConfig            LogicalChannelConfig               OPTIONAL,           -- Cond SetupM
      ...,
      [[    drb-TypeChange-r12        ENUMERATED (toMCG)                 OPTIONAL,           -- Need OP
            rlc-Config-v1250          RLC-Config-v1250                   OPTIONAL            -- Need ON
      ]],
      [[    rlc-Config-v1310          RLC-Config-v1310                   OPTIONAL,           -- Need ON
            drb-TypeLWA-r13           BOOLEAN                            OPTIONAL,           -- Need ON
            drb-TypeLWIP-r13          ENUMERATED (lwip, lwip-DL-only,
                                      lwip-UL-only, eutran)              OPTIONAL            -- Need
ON
      ]]
}
```

(5..10)

Mode II: A bitmap is used to indicate a cell group associated with each logical channel of a packet duplication bearer.

In this mode, two bitmaps are used to respectively indicate cell groups associated with two logical channels of a packet duplication bearer. Each bit of the bitmap indicates one cell, and the length of the bitmap can be the number of cells configured for the UE or the maximum number of cells that can be configured for the UE or the maximum value of a cell identity supported by a system. Cells corresponding to all "1s" in the bitmap form a cell group. Preferably, the cells indicated by the bitmap do not comprise the PCell. In this case, the first bit (namely the leftmost bit or the rightmost bit) of the bitmap is used to indicate a cell of which a cell identity (which can be denoted as sCellIndex) is "1", the second bit is used to indicate a cell of which a cell identity is "2", and so on. In carrier aggregation, it can be predefined or configured by default that the PCell is associated with a logical channel having a smaller, smallest, larger, or largest logical channel identity. Alternatively, the cells indicated by the bitmap comprise the PCell, and in this case the first bit or the last bit of the bitmap indicates the PCell. It can be predefined that a cell group indicated by a first bitmap is associated with a logical channel having a smaller (or smallest or larger or largest) logical channel identity, and a cell group indicated by a second bitmap is associated with a logical channel having a larger (or largest or smaller or smallest) logical channel identity.

The bitmap can be contained in RRC signaling, for example, contained in an RRC reconfiguration message. Further, the bitmap can be contained in RRC signaling used for configuring a packet duplication bearer, for example, contained in an information element such as RadioResourceConfigDedicated, Mac-MainConfig, LogicalChannel-Config, or RLC-Config.

If the bitmap is contained in a common configuration information element of a duplication bearer, for example, contained in an information element RadioResourceConfigDedicated or Mac-MainConfig, then cells corresponding to all "1s" in the bitmap form a cell group, and cells corresponding to all "0s" in the bitmap form a cell group.

Mode III: One cell list is configured for each logical channel of a packet duplication bearer.

In this embodiment, two cell lists are configured to indicate cell groups associated with each logical channel of a packet duplication bearer. Cells in each cell list form a cell group. A first cell list can be associated with a logical channel having a smaller (or smallest or larger or largest) logical channel identity of a packet duplication bearer, and a second cell list can be associated with a logical channel having a larger (or largest or smaller or smallest) logical channel identity of a packet duplication bearer. Preferably, it can be explicitly specified which cell list the PCell is contained in. Alternatively, it is predefined that the PCell is contained in a cell group formed by cells in the first or second cell list. Alternatively, the PCell is always associated with a logical channel having a smaller, smallest, larger, or largest logical channel identity of a certain packet duplication bearer.

The cell list can be contained in RRC signaling, for example, contained in an RRC reconfiguration message. Further, the cell list can be contained in RRC signaling used for configuring a packet duplication bearer, for example, contained in an information element such as RadioResourceConfigDedicated, Mac-MainConfig, LogicalChannel-Config, or RLC-Config.

Note that in the embodiment of the present invention, "a cell group (or PCell) is associated with a certain logical channel" can also be expressed as "a cell group (or PCell) is associated with a certain RLC entity (the RLC entity corresponds to the logical channel, namely data from the RLC entity is transmitted to MAC via the logical channel)" or "data from a certain logical channel is transmitted via radio resources provided by a cell group (or a cell in the cell group)(or PCell)" or "a cell group (or a cell in the cell group)(or PCell) serves a logical channel."

Figure 6:
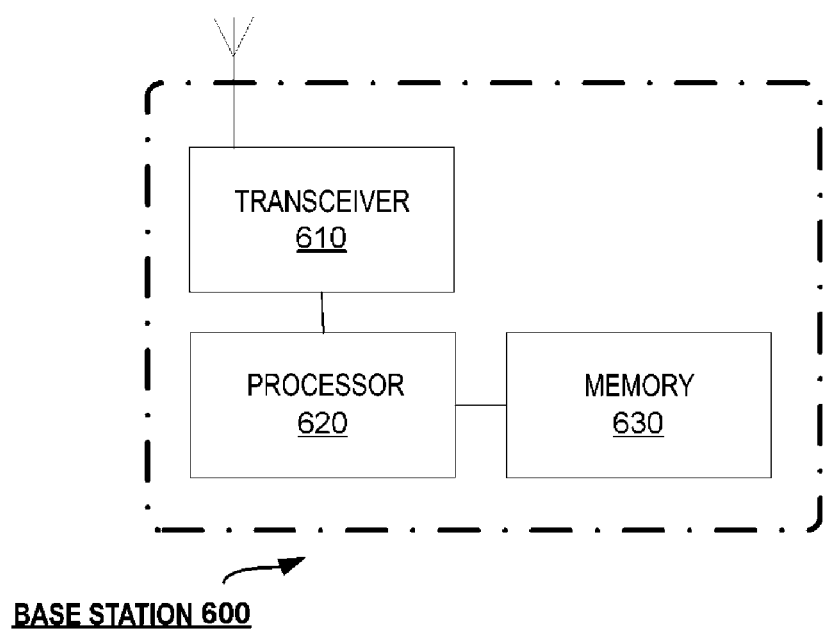
FIG. 6 is a block diagram of a base station according to an embodiment of the present disclosure.

In accordance with the method 500 described above, the present disclosure provides a base station. FIG. 6 is a block diagram of a base station 600 according to an embodiment of the present disclosure. As shown in the figure, the base station 600 includes a transceiver 610, a processor 620, and a memory 630, where the processor 630 stores instructions executable by the processor 620 so that the base station 600 executes the method 600 described above with reference to FIG. 5.

Specifically, the processor 630 stores the instructions executable by the processor 620 so that the user equipment 600 provides, for logical channels or Radio Link Control (RLC) entities associated with packet duplication bearers, cell or cell group configurations to User Equipment (UE), where each cell or cell group configuration comprises two or more cells or cell groups.

In an example, logical channels or RLC entities associated with two or more packet duplication bearers have the same cell or cell group configuration. Alternatively, the packet duplication bearers comprise a packet duplication data bearer and a packet duplication signaling bearer, and the packet duplication data bearer and the packet duplication signaling bearer have different cell or cell group configurations. Alternatively, a cell or cell group configuration of logical channels or RLC entities associated with each packet duplication bearer is separately provided.

In an example, for each packet duplication bearer, each cell in a cell set pre-configured for the UE is associated with one of logical channels associated with the packet duplication bearer, where the providing cell group configurations to UE comprises: for one logical channel associated with the packet duplication bearer, explicitly configuring a first cell group for the UE so that a cell in the set and not contained in the first cell group is contained by default in a second cell group configured for another logical channel associated with the packet duplication bearer. Alternatively, for each packet duplication bearer, each cell in a subset of a cell set pre-configured for the UE is associated with one of logical channels associated with the packet duplication bearer, where the providing cell group configurations to UE includes: for the logical channels associated with the packet duplication bearer, explicitly configuring a first cell group and a second cell group for the UE respectively.

In an example, the explicitly configuring a first cell group or a second cell group comprises: for each cell, using an identity to indicate a cell group to which the cell belongs or a logical channel with which the cell is associated; or, for each cell, using a bitmap or a logical channel list to indicate a cell group to which the cell belongs or a logical channel with which the cell is associated; or, for each logical channel associated with each packet duplication bearer, using a bitmap to indicate a cell with which the logical channel is associated.

Figure 7:
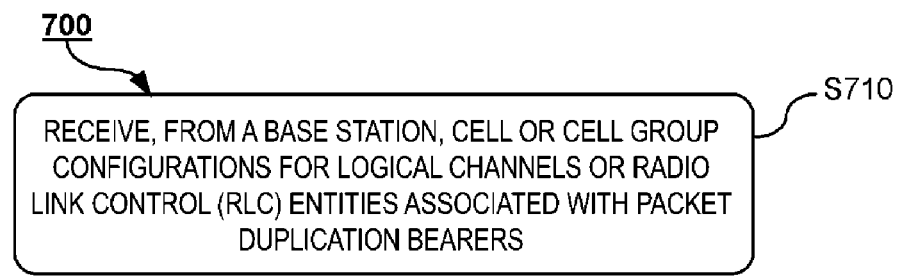
FIG. 7 is a flowchart of a method used in user equipment according to an embodiment of the present disclosure.

The present disclosure further provides a method used in User Equipment (UE). FIG. 7 is a flowchart of a method 700 used in UE according to an embodiment of the present disclosure. As shown in the figure, the method 700 includes the following steps.

In step S710, cell or cell group configurations for logical channels or Radio Link Control (RLC) entities associated with packet duplication bearers are received from a base station, where each cell or cell group configuration comprises two or more cells or cell groups.

In an example, logical channels or RLC entities associated with two or more packet duplication bearers have the same cell or cell group configuration. Alternatively, the packet duplication bearers comprise a packet duplication data bearer and a packet duplication signaling bearer, and the packet duplication data bearer and the packet duplication signaling bearer have different cell or cell group configurations. Alternatively, a cell or cell group configuration for logical channels or RLC entities associated with each packet duplication bearer is separately configured.

In an example, for each packet duplication bearer, each cell in a cell set pre-configured for the UE is associated with one of logical channels associated with the packet duplication bearer, where the receiving cell group configurations includes: for one logical channel associated with the packet duplication bearer, receiving an explicit configuration of a first cell group so that a cell in the set and not contained in the first cell group is contained by default in a second cell group configured for another logical channel associated with the packet duplication bearer. Alternatively, for each packet duplication bearer, each cell in a subset of a cell set pre-configured for the UE is associated with one of logical channels associated with the packet duplication bearer, where the receiving cell group configurations comprise: for the logical channels associated with the packet duplication bearer, receiving explicit configurations of a first cell group and a second cell group respectively.

In an example, the explicit configurations of the first cell group or the second cell group include: for each cell, using an identity to indicate a cell group to which the cell belongs or a logical channel with which the cell is associated; or, for each cell, using a bitmap or a logical channel list to indicate a cell group to which the cell belongs or a logical channel with which the cell is associated; or, for each logical channel associated with each packet duplication bearer, using a bitmap to indicate a cell with which the logical channel is associated.

Figure 8:
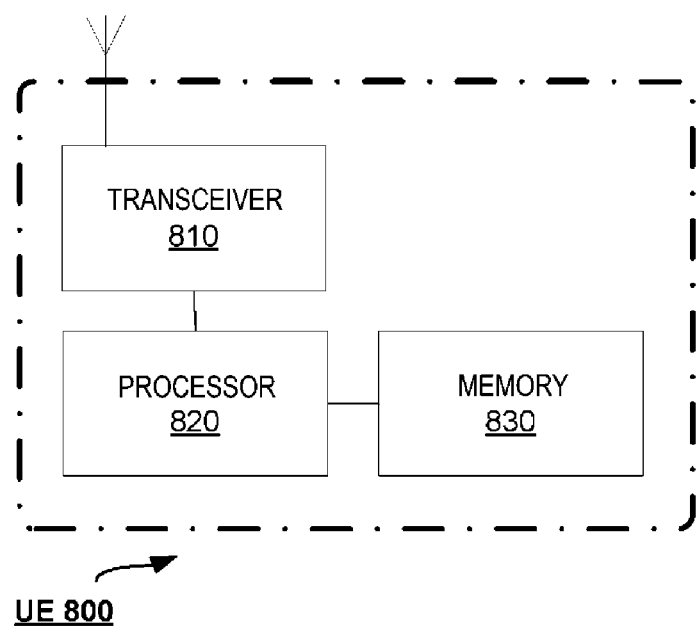
FIG. 8 is a block diagram of user equipment according to an embodiment of the present disclosure.

In accordance with the method 700 described above, the present disclosure provides User Equipment (UE). FIG. 8 is a block diagram of UE 800 according to an embodiment of the present disclosure. As shown in the figure, the UE 800 includes a transceiver 810, a processor 820, and a memory 830, the processor 830 storing instructions executable by the processor 820 so that the user equipment 800 executes the method 700 described above with reference to FIG. 7.

Specifically, the processor 830 stores instructions executable by the processor 820 so that the user equipment 800 receives, from a base station, cell or cell group configurations for logical channels or Radio Link Control (RLC) entities associated with packet duplication bearers, where each cell or cell group configuration comprises two or more cells or cell groups.

In an example, logical channels or RLC entities associated with two or more packet duplication bearers have the same cell or cell group configuration. Alternatively, the packet duplication bearers include a packet duplication data bearer and a packet duplication signaling bearer, and the packet duplication data bearer and the packet duplication signaling bearer have different cell or cell group configurations. Alternatively, a cell or cell group configuration for logical channels or RLC entities associated with each packet duplication bearer is separately configured.

In an example, for each packet duplication bearer, each cell in a cell set pre-configured for the UE is associated with one of logical channels associated with the packet duplication bearer, where the receiving cell group configurations includes: for one logical channel associated with the packet duplication bearer, receiving an explicit configuration of a first cell group so that a cell in the set and not contained in the first cell group is contained by default in a second cell group configured for another logical channel associated with the packet duplication bearer. Alternatively, for each packet duplication bearer, each cell in a subset of a cell set pre-configured for the UE is associated with one of logical channels associated with the packet duplication bearer, where the receiving cell group configurations includes: for the logical channels associated with the packet duplication bearer, receiving explicit configurations of a first cell group and a second cell group respectively.

In an example, the explicit configurations of the first cell group or the second cell group include: for each cell, using an identity to indicate a cell group to which the cell belongs or a logical channel with which the cell is associated; or, for each cell, using a bitmap or a logical channel list to indicate a cell group to which the cell belongs or a logical channel with which the cell is associated; or, for each logical channel associated with each packet duplication bearer, using a bitmap to indicate a cell with which the logical channel is associated.

For cell/cell group configurations for a packet duplication bearer, the aspects, features, and examples described above with respect to the method 500 are also applicable to the base station 600, the method 700, and the UE 800.

The computer-executable instructions or program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

The computer-executable instructions or program for implementing the functions of the embodiments of the present invention may be recorded on a computer-readable storage medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A user equipment (UE) comprising:
   a receiving circuitry configured to receive a radio resource control (RRC) message, wherein the RRC message is used to configure:
      a first serving cell list in a first LogicalChannelConfig information element (IE) for a first logical channel of a signaling radio bearer (SRB), wherein the first serving cell list is associated with the first logical channel as a result of the first logical channel corresponding to a logical channel identity value; and
      a second serving cell list in a second LogicalChannelConfig IE for a second logical channel of the SRB configured with duplication in carrier aggregation, wherein the second serving cell list is associated with the second logical channel as a result of the second logical channel corresponding to a different logical channel identity value;
      wherein a PCell is included in either the first serving cell list or the second serving cell list; and
   a transmitting circuitry configured to transmit, on serving cells in the first serving cell list, data from the first logical channel, and to transmit, on serving cells in the second serving cell list, data from the second logical channel, wherein:
      the first LogicalChannelConfig IE is used to configure logical channel parameters of the first logical channel;
      the second LogicalChannelConfig IE is used to configure logical channel parameters of the second logical channel; and
      the serving cells in the first serving cell list and the serving cells in the second service cell list are associated with a same MAC entity.

2. A method performed by a user equipment (UE), comprising:
receiving a radio resource control (RRC) message which is used to configure:
   a first serving cell list in a first LogicalChannelConfig information element (IE) for a first logical channel of a signaling radio bearer (SRB), wherein the first serving cell list is associated with the first logical channel as a result of the first logical channel corresponding to a logical channel identity value; and
   a second serving cell list in a second LogicalChannelConfig IE for a second logical channel of the SRB configured with duplication in carrier aggregation, wherein the second serving cell list is associated with the second logical channel as a result of the second logical channel corresponding to a different logical channel identity value;
   wherein a PCell is included in either the first serving cell list or the second serving cell list;
transmitting, on serving cells in the first serving cell list, data from the first logical channel; and
transmitting, on serving cells in the second service cell list, data from the second logical channel, wherein:
   the first LogicalChannelConfig IE is used to configure logical channel parameters of the first logical channel;
   the second LogicalChannelConfig IE is used to configure logical channel parameters of the second logical channel; and
   the serving cells in the first serving cell list and the serving cells in the second service cell list are associated with a same MAC entity.

3. A base station comprising:
   a transmitting circuitry configured to transmit a radio resource control (RRC) message which is used by a user equipment (UE) to configure:
      a first serving cell list in a first LogicalChannelConfig information element (IE) for a first logical channel of a signaling radio bearer (SRB), wherein the first serving cell list is associated with the first logical channel as a result of the first logical channel corresponding to a logical channel identity value; and
      a second serving cell list in a second LogicalChannelConfig IE for a second logical channel of the SRB configured with duplication in carrier aggregation, wherein the second serving cell list is associated with the second logical channel as a result of the second logical channel corresponding to a different logical channel identity value;
      wherein a PCell is included in either the first serving cell list or the second serving cell list;
   a receiving circuitry configured to receive, on serving cells in the first serving cell list, data from the first logical channel, and to receive, on serving cells in the second serving cell list, data from the second logical channel, wherein:
      the first LogicalChannelConfig IE is used to configure logical channel parameters of the first logical channel;
      the second LogicalChannelConfig IE is used to configure logical channel parameters of the second logical channel; and
      the serving cells in the first serving cell list and the serving cells in the second service cell list are associated with a same MAC entity.

4. A method performed by a base station, comprising:
transmitting a radio resource control (RRC) message which is used by a user equipment (UE) to configure:

a first serving cell list in a first LogicalChannelConfig information element (IE) for a first logical channel of a signaling radio bearer (SRB), wherein the first serving cell list is associated with the first logical channel as a result of the first logical channel corresponding to a logical channel identity value; and a second serving cell list in a second LogicalChannelConfig IE for a second logical channel of the SRB configured with duplication in carrier aggregation, wherein the second serving cell list is associated with the second logical channel as a result of the second logical channel corresponding to a different logical channel identity value;

wherein a PCell is included in either the first serving cell list or the second serving cell list;

receiving, on serving cells in the first serving cell list, data from the first logical channel; and receiving, on serving cells in the second service cell list, data from the second logical channel, wherein:

the first LogicalChannelConfig IE is used to configure logical channel parameters of the first logical channel;

the second LogicalChannelConfig IE is used to configure logical channel parameters of the second logical channel; and the serving cells in the first serving cell list and the serving cells in the second service cell list are associated with a same MAC entity.

* * * * *